United States Patent [19]

Hoover et al.

[11] 4,018,997
[45] Apr. 19, 1977

[54] PLUGGABLE KEY SET TELEPHONE CROSS CONNECT DEVICE

[75] Inventors: Charles Donald Hoover, Harrisburg; Jared Nathan Worman, Camp Hill, both of Pa.

[73] Assignee: AMP Incorporated, Harrisburg, Pa.

[22] Filed: Oct. 1, 1975

[21] Appl. No.: 618,666

Related U.S. Application Data

[63] Continuation-in-part of Ser. No. 468,773, May 10, 1974, abandoned.

[52] U.S. Cl. ................................................ 179/98
[51] Int. Cl.² ........................................ H04Q 1/02
[58] Field of Search ........... 179/98, 99, 91 R, 1 PC

[56] References Cited

UNITED STATES PATENTS

| | | | |
|---|---|---|---|
| 3,665,112 | 5/1972 | Blake et al. ................. | 179/99 |
| 3,763,325 | 10/1973 | Kapel et al. ................. | 179/98 |
| 3,800,097 | 3/1974 | Maruscak et al. ............ | 179/98 |
| 3,869,582 | 3/1975 | Humphrey et al. .......... | 179/98 |

FOREIGN PATENTS OR APPLICATIONS 1,248,115   8/1967   Germany ............................ 179/98

*Primary Examiner*—Thomas W. Brown
*Attorney, Agent, or Firm*—Russell J. Egan

[57] ABSTRACT

A device for selectively interconnecting a plurality of telephone key sets with a number of incoming telephone lines is disclosed. The device facilitates rapid and easy cross connecting of telephone key sets on specific premises with selected incoming lines without the requirement for the work to be accomplished by skilled technicians. The subject device includes a terminal station which is interconnected between incoming lines and a plurality of individual key sets located within a particular prescribed area. The interconnection of the individual sets with incoming lines is accomplished by cross connecting connectors for the individual key sets and connectors for the lines with jumper cables. The jumper cables have four or more conductors with an extra conductor being used when it is desired to have the designated key set ring.

12 Claims, 6 Drawing Figures

PLUGGABLE KEY SET TELEPHONE CROSS CONNECT DEVICE

CROSS REFERENCE TO RELATED APPLICATION

The present application is a continuation-in-part of our application Ser. No. 468,773 filed May 10, 1974, now abandoned.

BACKGROUND OF THE INVENTION

1. The Field Of The Invention

The present invention relates to a device for cross connecting a plurality of key telephone sets within a specific location to several incoming lines and, in particular, to a cross connecting device which allows unskilled personnel to effect correct interconnection of an internal telephone system.

2. The Prior Art

The installation of a customer telephone system on a particular premises, and in particular to the rearrangement of the telephone system as the customer's business expands and/or the arrangement of personnel is revised and relocated, is a major factor in both the installation and maintenance costs of such a system. It is estimated that the current costs of switching telephone lines connected to a key set telephone may be as high as 60 to 70 dollars. Most of this expense is in labor costs.

The present practice is to have entrance cables or lines from a central telephone office terminate at a terminal room in an office building or the like. The terminal room is normally adjacent to an equipment room which primarily houses PBX equipment, and the like, which is required for the particular customer needs. Generally there are also a number of apparatus or satellite rooms located throughout the building and which contain equipment regarding service to particular defined areas within the building, for example a floor, a wing, a particular office or an office complex. As a specific example, a single floor of a modern office building might contain several suites of offices relating to a number of separate businesses, such as professional offices of doctors, lawyers, engineers, etc., or a number of commercial enterprises, such as sales office for a number of separate corporations. Each of these suites of offices would have their own internal telephone system, which currently requires the services of a skilled technician for installation since each key telephone is connected to the incoming lines by a cable, usually made of twenty-five individual wire pairs, each of which must be terminated according to a defined pattern on a contact board, such as the one described in U.S. Pat. No. 3,777,223. If the cross connections allowing the various telephone key sets to respond to various designated incoming lines are to be changed, then the wires of the cables, which were inserted into the associated contact board by the craftsman, must be removed from their contact slots and rearranged according to the new desired configuration. The common 25 pair cable would require at least three pairs of conductors from the Red field to be reconnected to the Blue field. An extra pair would also have to be reconnected to have ring at the key set and it may be necessary to add a diode matrix block to the system and run several pair more of "split common audible" conductors. It becomes readily apparent that there will be many instances when the wires being rerouted will be too short and therefore require either pulling a new cable through the appropriate conduits or splicing additional lengths of wire to the existing cable wire. Of course these additional wire lengths must conform to the color code when attached to the cable. Further, the connections must be in a specific sequence since any missed count or reversed pair may damage the equipment or render the entire system inoperative. Also, the abovementioned diode matrix blocks are rarely used since they are easily installed wrong.

Most telephone key sets come in standard six and 10 button models capable of handling five and nine incoming lines respectively. The remaining button is reserved for "hold". The cross connection of these key sets with incoming lines to the office and, in particular, the temporary cross connection of certain telephone key sets to handle calls from other lines, as may be required by personnel absenses due to business, vacation, and the like, is an expensive and time consuming problem since this work can only be correctly accomplished by the highest skilled craftsmen of the telephone company. The current labor costs involved are usually too high to justify going to such an expense for only a temporary period, especially since much of the expense is for work which is erased when the system is returned to the original condition. Also the time delays in getting this work done can obviate the requirement for the temporary change.

U.S. Pat. No. 3,869,582 discloses a general scheme for interconnecting telephone incoming lines and specific locations. However, the described scheme raises a number of unanswered questions when applied to key set type telephones. For example, FIG. 6 shows a standard circuit concentration bay termination manufactured by Amphenol, as mentioned in column 3, line 13. This is a non-polarized connector and raises the strong possibility of having reversed leads between ring and tip connections. Such reversals will definitely create a no operation condition of push-button key set telephones and may cause failures in some types of equipment. Thus they definitely would not be suitable for use by untrained personnel. The four contact panels, as well as the four contact plugs and receptacles, (as shown in FIGS. 7A, 7B, 8A, and 8B of the drawings) are inadequate for use with "key set-type telephones" since most key set telephones currently in use utilize one or more twenty-five pair cable connectors, such as the one described under U.S. Pat. No. 3,777,223. Also, use of unpolarized connectors for jumpering purposes with key set telephones would create chaos with the KTU (Key Telephone Unit) line cards, as well as the KSU (Key Service Unit) in the equipment room, which would result in equipment failure. Again, trained personnel would be required to change connections. The use of any connectorized system for changing lines without a diode matrix would be difficult (see Bell System Practices AT&T Co., Standard, Section 461-620-100, Issue 2, Dec. 1971, Matrix Block 1A1 System). Normally, each line on each key set telephone is connected to a separate bell, i.e., six lines, six bells or a diode matrix block. Otherwise there would be feedback and unactivated lines would have their bells ringing regardless of which line had the incoming call. Either of these methods would require the more highly skilled telephone craftsman to install or change.

SUMMARY OF THE INVENTION

The present invention relates to a device for rapidly and easily cross connecting a plurality of incoming telephone lines with a plurality of individual telephone key sets at a defined customer location or substation without the requirement for the employment of a skilled technician for effecting the appropriate connections. The device includes a customer terminal substation having a standard connector from the telephone cabling or incoming lines and a like connector for each key set within the customer's internal telephone system. Intermediate the terminal station connector and individual key set connectors there are a plurality of first connector receptacles for each incoming line and a plurality of second connector receptacles for each individual key set. Cross connector jumper cablss are selectively interconnected between the first and second receptacles for effecting the desired interconnection whereby specific key sets will be arranged to ring and/or answer incoming calls from selected lines.

It is therefore an object of the present invention to produce a telephone cross connect device which allows unskilled personnel to rearrange the interconnection of the telephone key sets within a specific location to any of the incoming telephone lines to that location.

It is a further object of the present invention to produce a telephone cross connection device which, once installed, can be rapidly and easily reconnected to allow any key set within the local telephone system to answer any incoming line on either a temporary or permanent basis.

It is a further object of the present invention to provide a telephone cross connect device which can be programmed prior to installation and rapidly and easily revised on site to temporarily or permanently connect specific key sets with various incoming lines.

The means for accomplishing the foregoing and other objects of the present invention will become apparent from the following detailed description taken with reference to the accompanying drawings.

DETAILED DESCRIPTION OF THE PRESENT INVENTION

Figure 1:
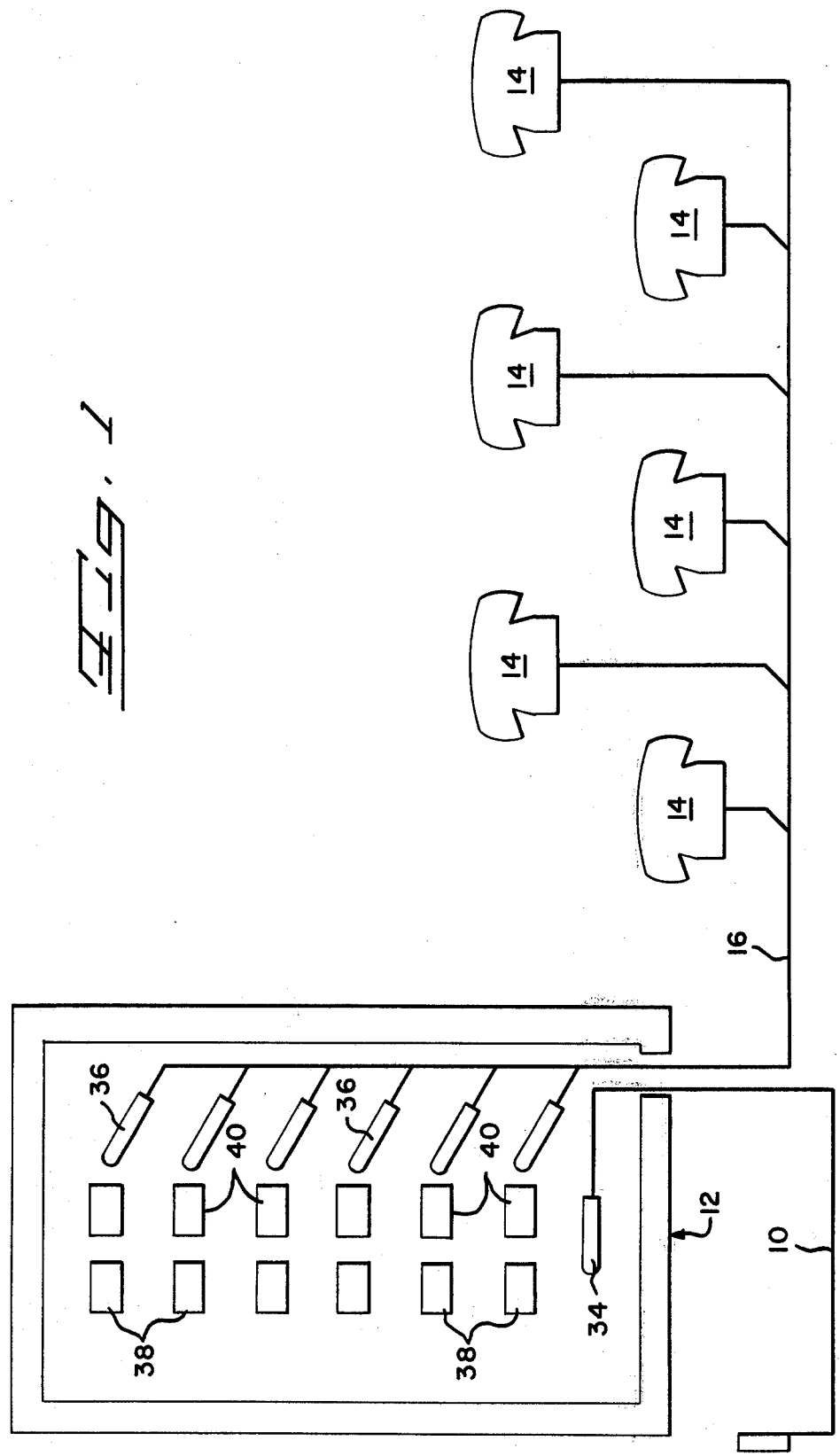
FIG. 1 is a schematic view of a satellite installation of the type that would be serviced by the subject cross connect device.

The present invention relates to a new concept in cross connecting a plurality of incoming lines to a plurality of telephone key sets at a defined customer location and offers extreme ease in both the original installation and subsequent changing within the particular defined area or substation. This device is so designed that minimally trained craftsmen can put it into initial operation and totally untrained personnel can make all subsequent changes of service in regard to particular key sets responding to particular incoming telephone lines. In the satellite installation or substation, shown schematically in FIG. 1, a telephone cable 10 is connected to the primary telephone cabling or lines to a particular office building with the lines terminating at either a terminal equipment room located on a specific floor, in the case of a very large building, or an equipment room for the entire building. The substation terminal 12 is located at the customer's suite of offices, for example, and is interconnected with a plurality of individual key sets 14, in this case six in number, by conventional multi-pair cables 16.

Figure 2:
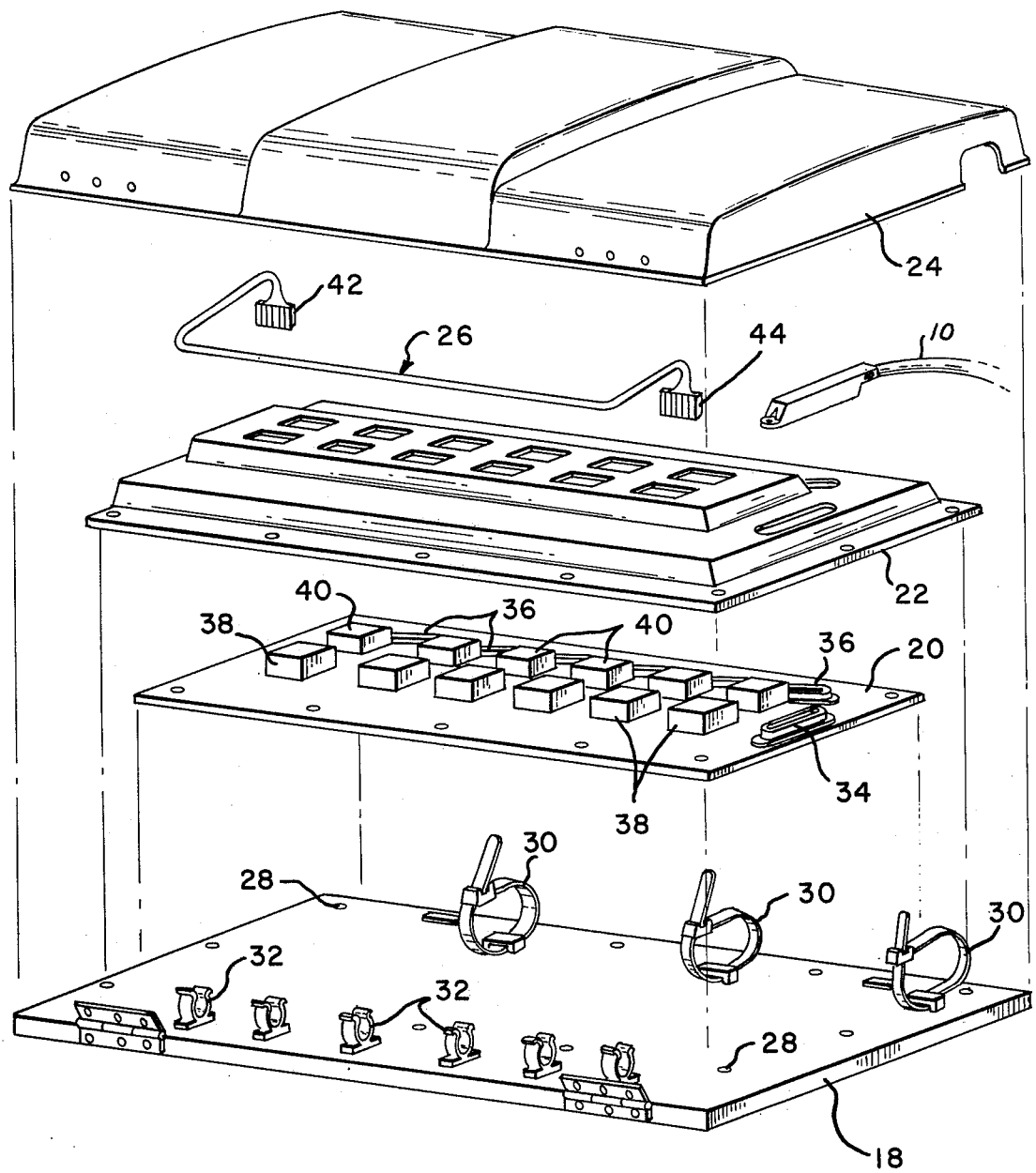
FIG. 2 is an exploded perspective view of a terminal substation incorporating the subject cross connect device.

The terminal substation itself, see FIG. 2, includes a mounting back board 18, a fixed circuit board 20, an inner cover 22, an outer cover 24, and a plurality of jumper cable assemblies 26. The back board 18 has mounting holes 28 formed therein and is provided on one side with a plurality of cable ties 30, which may be of the types disclosed in U.S. Pat. Nos. 3,438,095; 3,653,099, and 3,694,863. On the opposite side of the back board there are a plurality of jumper cable dressing clips 32, which likewise are of a known standard configuration.

Figure 5:
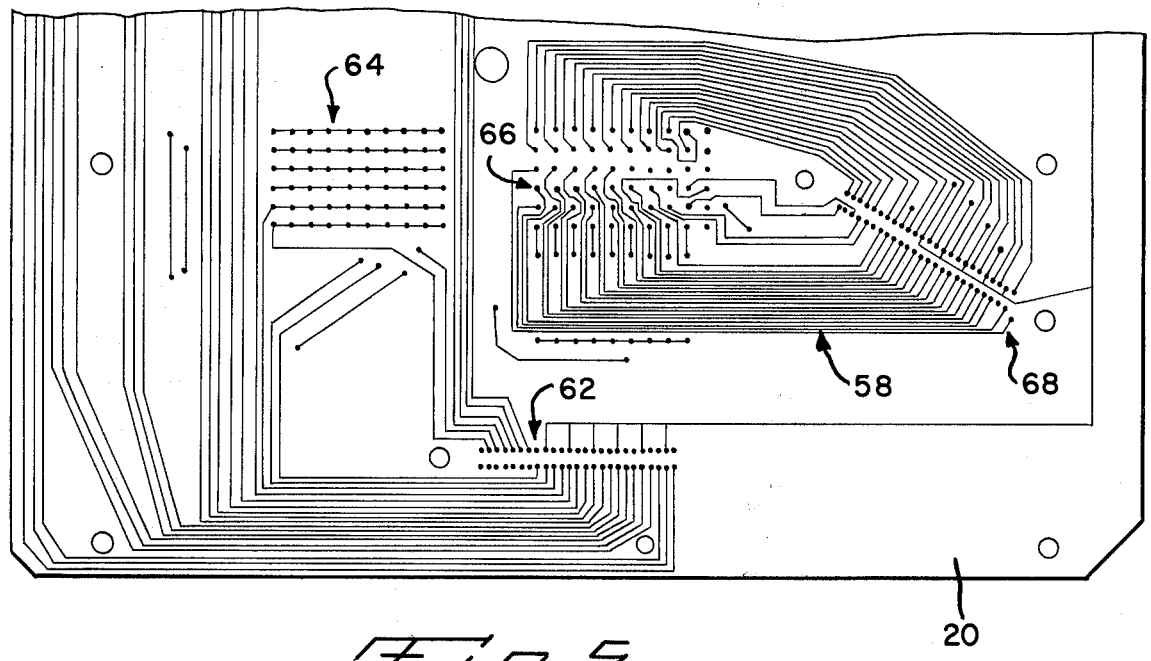
FIG. 5 is a partial plan view of the obverse side of one end of the printed circuit board shown in FIG. 2.
Figure 6:
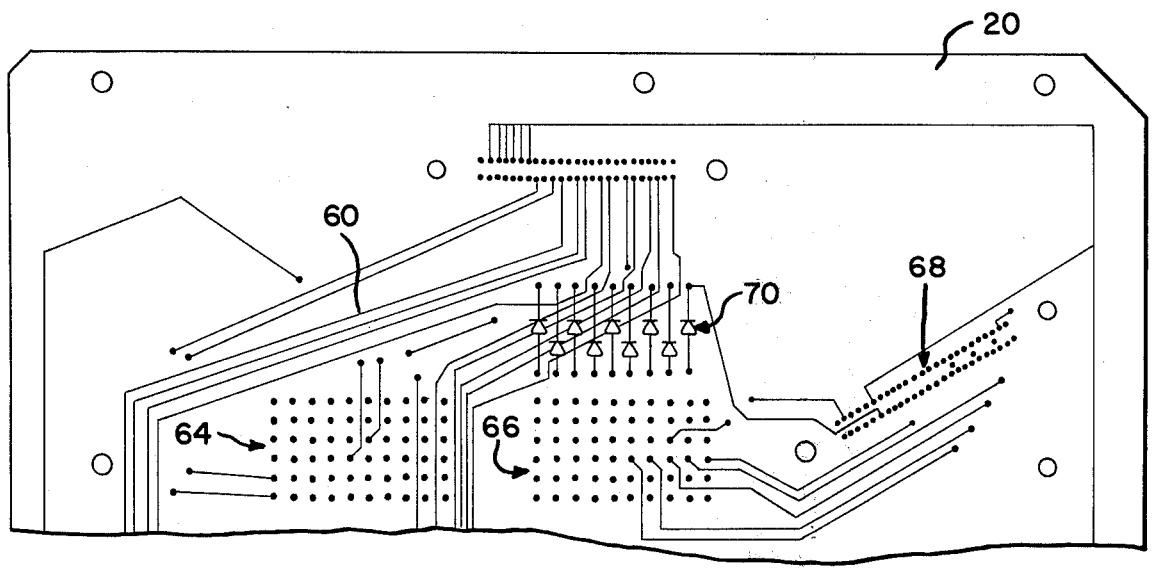
FIG. 6 is a partial plan view of the reverse side of the same end of the printed circuit board shown in FIG. 5.

The fixed circuit board 20 is preferably a fixed wiring arrangement, such as a printed circuit board, flat flexible circuitry, or even individual wires attached to a hard board. One end portion of the obverse and reverse surfaces of the circuit board 20 are shown in FIGS. 5 and 6, respectively. The circuit board has fixed thereto an incoming line connector 34 and a plurality of key set connectors 36. These connectors preferably are of the well known type described in U.S. Pat. No. 3,760,335. The circuit board also has fixed thereto a plurality of high density first or Red field receptacle units 38 and a plurality of high density second or Blue field receptacle units 40. The number of both the first and second receptacle units 38 and 40 is normally equal to the number of incoming lines to the satellite station. Each of the first receptacle units 38 is associated with a specific one of the incoming lines and each of the second receptacle units 40 with a specific key set. Each of the first and second receptacle units includes at least five horizontal rows of up to 10 receptacles. The rows of the units 38 are connected in common while the rows of the units 40 are connected sequentially to the buttons of the respective key set. The interconnection between the incoming line connector 34 and units 38 and between the key set connectors 36 and units 40 is by the fixed circuitry 58, 60, respectively, on the circuit board 20. The board also has a number of through holes including 62 which receives the incoming line connector 34, 64 which receive the connector units 38, 66 which receive the connector units 40 and 68 which receive the key set connectors 36. The board further includes a diode matrixing arrangement 70 for each key set. The diode matrixing allows any incoming call to ring only those key sets connected to that specific line which are programmed to ring via the proper jumper. This is accomplished by having nine diodes connected to nine receptacles of the respective units 40. The diodes are connected in parallel with their cathodes commoned and their anodes connected to the respective receptacles. The diode matrix converts alternating current ringing voltage to a pulsating direct current because it allows the current to flow in one direction only. This prohibits the current from flowing backwards from a desired bell ringing, as the result of an incoming call, to an undesired bell ringing on an uncalled line.

Figure 3:
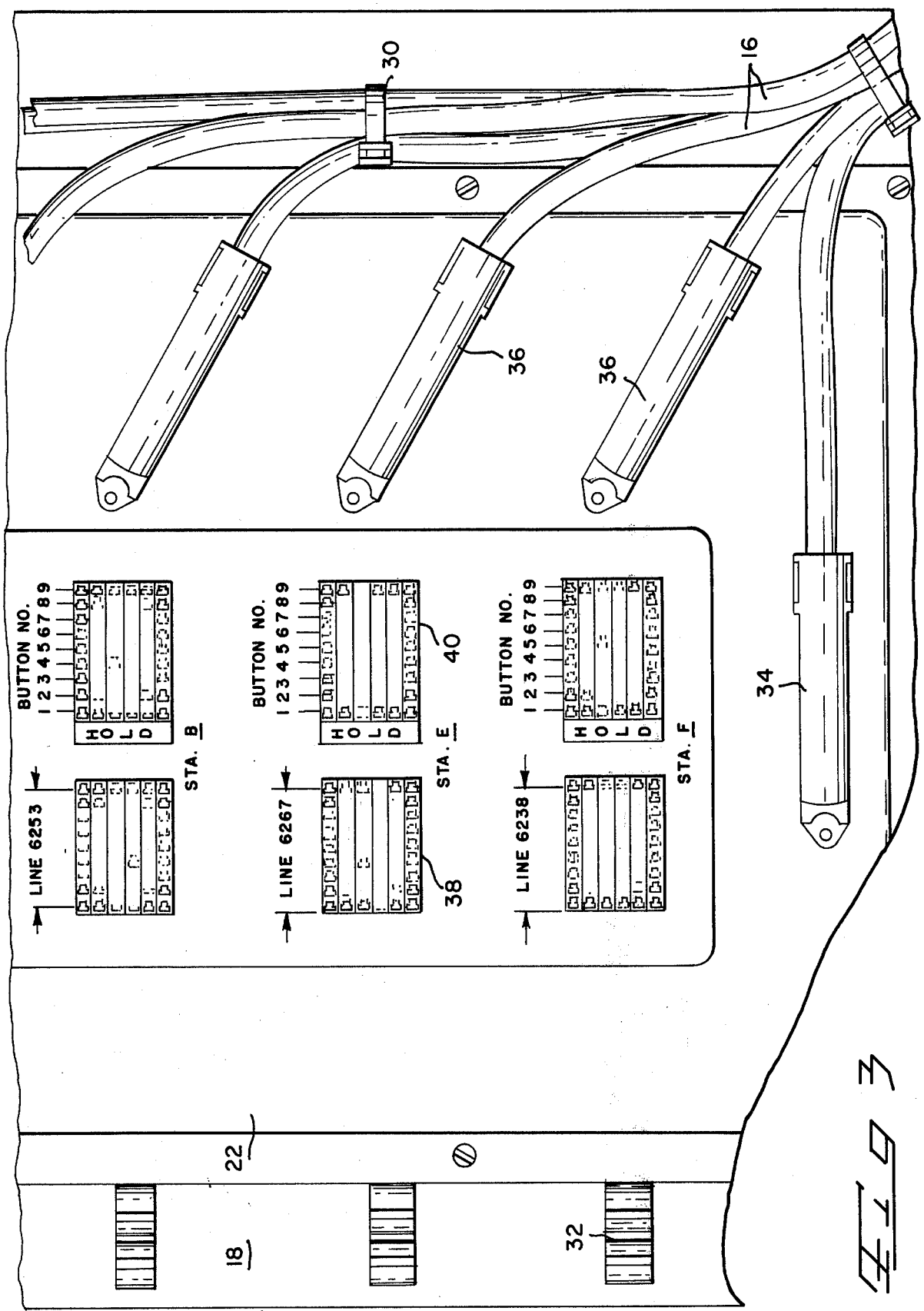
FIG. 3 is a plan view of a portion of the inner cover of the terminal substation shown in FIG. 2.

As shown in FIGS. 2 and 3, all lines are in an open condition. There must be the proper cross connection of jumper cables 26 between receptacle units 38 and 40 to effect an operative connection between an incoming line and an associated key set. The jumper cables 26 are preferably of two general types and are formed in several standardized lengths. The two types are a five wire version and a six wire version, each of which is terminated by identical six cavity plugs 42, 44. The plugs are preferably of the type disclosed in U.S. Pat. Nos. 3,874,763 or 3,901,575.

Figure 4:
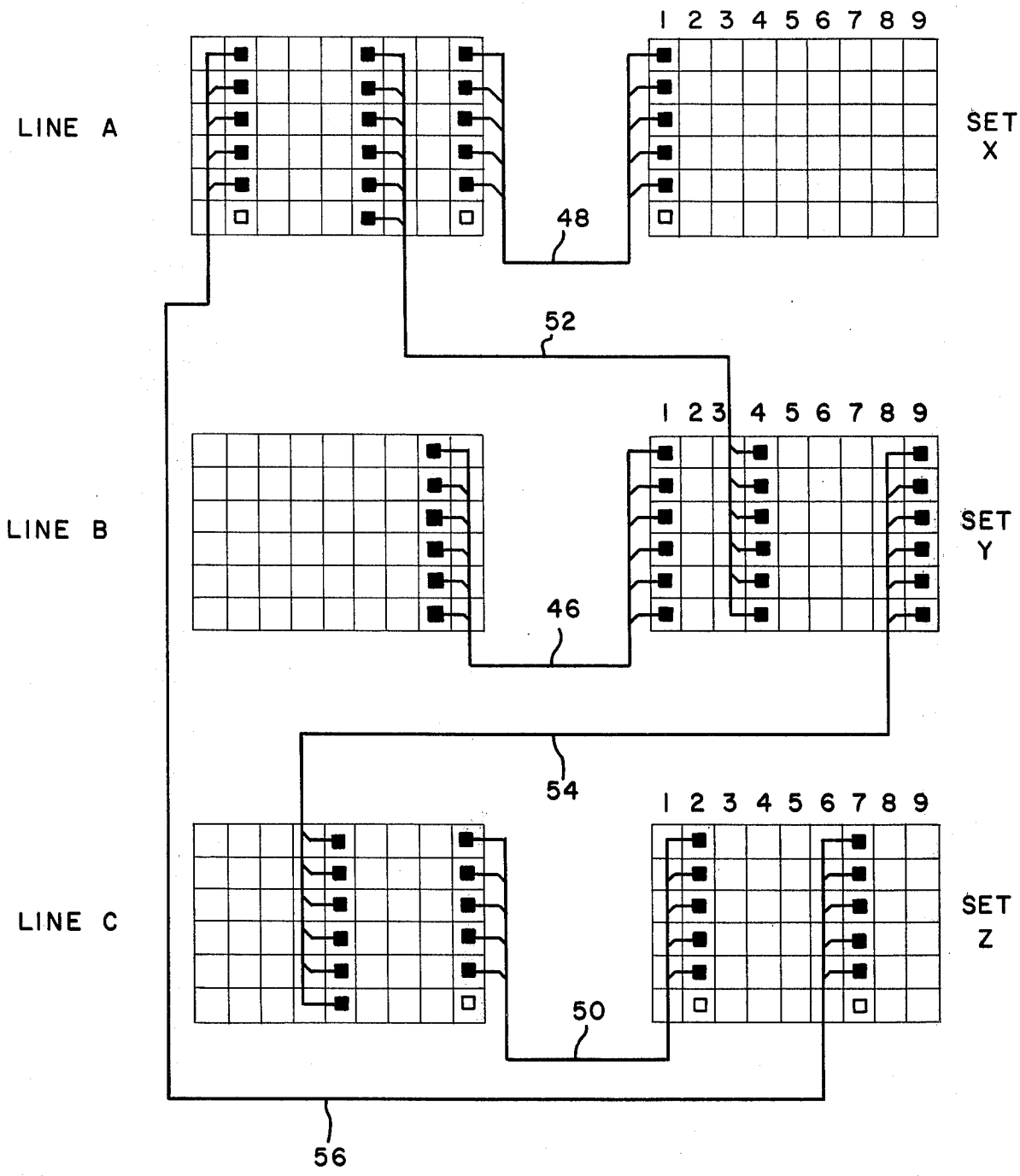
FIG. 4 is a diagrammatic view showing the cross connection of three key sets and three incoming lines according to the subject cross connect device.

The cross connection of the incoming lines to the key sets of the substation will be described with reference to FIG. 4, which schematically illustrates only three pairs of the receptacle units 38 and 40. In this instance it will be assumed that the units 38 are connected by the circuit board 20 to lines here designated as A, B, and C while the units 40 are connected to key set stations X, Y, and Z. It will also be assumed that station Y will be a reception station which must be able to respond to all three of the incoming lines. Jumper cable 46 is cross connected between any one of the receptacles of unit 38 of line B, since they are all in common, and the receptacle of unit 40 for the first button of station Y. A similar cross connection is provided by jumper cables 48 and 50 to connect line A with station X and line C with station Z, respectively. Thus each of the stations X, Y, Z will be able to respond to calls coming in from the respective lines A, B, and C. However, it was stated previously that station Y was to have the ability to respond to all of the incoming lines. Thus jumper cable 52 is connected between unit 38 of line A and the unit 40 receptacle for the fourth button of station Y and jumper cable 54 is connected between unit 38 of line C and the unit 40 receptacle for the ninth button of station Y. Station Y will now be able to answer all three of the incoming lines while station X and Z will be able to respond to only lines A and C, respectively.

It should be here noted that in making these cross connections, if it is desired to have the key set at location X, Y, or Z ring when a call comes on the respective line, then the jumper cable of the six wire type is used. If it is desired not to have the key set ring in response to an incoming call, then the jumper cable should be of the five wire type. Both the five wire and six wire jumper cables use identical six cavity polarized plugs at both ends thereof to assure proper polarization of the cables.

When a five wire jumper cable is used, as mentioned above, it is equipped with a six cavity plug, one plug cavity being empty. Since the plugs can only be inserted into the units 38, 40 in a single direction, this will insure that the wires that form the jumper cable are always properly oriented and polarized with respect to the receptacle units 38, 40. Thus substantially all possibility for cross connection error by misapplication of the plugs is eliminated.

The substation, as discussed above, is shown cross connected to be operative for normal situations. However, this will not be satisfactory for the situation where key set X will not be manned for a known period, such as when the person normally at that location is on vacation. In this instance it may be desired to have the personnel at key set Z respond to calls coming in to station X via line A. In order to allow station Z to respond to line A, jumper cable 56 is installed between a receptacle of unit 38 for line A and the receptacle of unit 40 for button 7 of station Z. At the same time the jumper cable 48 can be removed or replaced by a five wire jumper so that the key set at station X will not ring but will be available should information have to be communicated from key set X. The jumper 56 would allow station Z to respond directly to calls on line A. In order to effect this connection it is a simple matter to have any available personnel simply make the appropriate cross connection and, since the plugs are keyed, it is substantially impossible to make any cross connection which will in any way be detrimental to the system. The most that can happen is to cross connect the wrong line to the wrong key set or to the wrong button of the correct key set or to use the wrong jumper cable with regard to having a ring or no ring condition. Other errors are substantially impossible with this device.

The subject cross connect device allows the optional installation of added features, such as signal buzzers, dial intercom, speaker phones, etc., provided by spare wires coming from the key telephones. One and two position jumper cable assemblies are available for these applications and it is only necessary to make the appropriate interconnections to obtain the desired service. These jumper assemblies should preferably be of a different color combination from the jumper cables 26.

The present invention may be embodied in other specific forms and may be subject to many modifications and changes without departing from the spirit or essential characteristics thereof. The present embodiment is therefore to be considered in all respects as being illustrative and not restrictive.

What is claimed is:

1. A telephone substation cross connect device for selectively cross connecting a plurality of incoming telephone lines with a plurality of key set telephones, said device comprising:
    a line input connector connected with said plurality of incoming telephone lines;
    a plurality of first receptacle units;
    a plurality of second receptacle units;
    each said first and second receptacle unit comprising a closely spaced, high density cluster of female receptacles arranged in at least six horizontal rows and at least five vertical rows, each said receptacle having an electrical contact fixedly mounted therein and a key profiled entrance configuration,
    a plurality of key set connectors each connected to a respective one of said plurality of key set telephones;
    circuit board means including a rigid base member having said line input connector, said pluralities of said first and second receptacle units, and said key set connectors fixedly mounted thereon and fixed conductor means forming a plurality of first circuits interconnecting said line input connector with each of said first receptacle units and a plurality of second circuits each interconnecting one of said second receptacle units with a respective one of said key set connectors; and
    a plurality of jumper cables each having both ends terminated by identical key profiled plugs, said jumper cables having one plug engaged in one of said first receptacle units and the other plug engaged in one of said second receptacle units to selectively connect each said key set to at least one incoming telephone line,
    at least some of said jumper cables having six conductors and terminated by six cavity plugs, and
    at least some of said jumper cables having five conductors and terminated by six cavity plugs, one cavity being vacant, thereby assuring proper connection of the conductors with contacts in said receptacles.

2. A telephone substation cross connect device according to claim 1 wherein said circuit board means comprises:
a printed circuit board with said fixed conductor means integral therewith.

3. A telephone substation cross connect device according to claim 1 wherein each said second circuit interconnecting said second receptacle units with respective ones of said key set connectors includes diode matrixing means preventing ringing of the associated key set by stray currents.

4. A telephone substation cross connect device according to claim 1 wherein each said key set connector includes:
a female member; and
a male member matable with said female member, each of said members including contact means engaging standard multi-pair telephone cable.

5. A telephone substation cross connect device according to claim 1 wherein said line input connector includes:
a female member; and
a male member matable with said female member, each said male and female members including electrical contacts secured to the individual wires of standard multi-pair telephone cable.

6. A telephone substation cross connect device according to claim 1 wherein said jumper cables having five conductors terminated at opposite ends by like six cavity plugs are used to connect a key set telephone to an incoming line for no ring operation.

7. A telephone substation cross connect device according to claim 1 wherein said jumper cables having six conductors terminated at opposite ends by like six cavity plugs are used to connect a key set telephone to an imcoming line for ringing operation.

8. A telephone substation cross connect device according to claim 1 further comprising:
a mounting board having said circuit board fixedly mounted thereon.

9. A telephone substation cross connect device according to claim 8 further comprising:
at least one retainer clip means secured to said mounting board for dressing said jumper cables.

10. A telephone substation cross connect device according to claim 8 further comprising:
at least one cable tie means secured to said mounting board for dressing cables connected to said line input connector and said key set connectors.

11. A telephone substation cross connect device according to claim 8 further comprising:
cover means secured to said mounting board and enclosing said device.

12. A telephone substation cross connect device according to claim 11 wherein said cover means comprises:
an inner cover substantially enclosing said circuit board means; and
an outer cover substantially enclosing the entire substation cross connect device.

* * * * *